US006453738B1

(12) United States Patent
Cesmat et al.

(10) Patent No.: US 6,453,738 B1
(45) Date of Patent: Sep. 24, 2002

(54) METHOD AND APPARATUS FOR ANALYZING CASING WEAR AND RETRIEVAL OF METALLIC FRAGMENTS

(75) Inventors: Mark Cesmat, Bakersfield, CA (US); Don Holland, Bakersfield, CA (US)

(73) Assignee: Cesmat Service Company, Inc., Bakersfield, CA (US)

( * ) Notice: Subject to any disclaimer, the term of this patent is extended or adjusted under 35 U.S.C. 154(b) by 0 days.

(21) Appl. No.: 09/832,707

(22) Filed: Apr. 10, 2001

(51) Int. Cl.[7] .............................. B03C 1/02; B03C 1/35; B01D 35/06; G08B 17/10
(52) U.S. Cl. .................. 73/152.18; 73/61.42; 73/61.72; 73/152.55; 73/152.57; 210/222; 210/695; 324/204; 166/265; 175/46
(58) Field of Search ........................ 73/152.18, 152.19, 73/152.57, 152.55, 61.42, 61.72; 166/265; 175/46; 210/695, 222; 324/204

(56) References Cited

U.S. PATENT DOCUMENTS

| 2,252,222 A | * | 8/1941 | Van Os ........................ 200/52 |
| 3,457,504 A | * | 7/1969 | Arthur et al. ................. 324/65 |
| 3,682,256 A | * | 8/1972 | Stuart ........................... 175/40 |
| 3,713,499 A |   | 1/1973 | Arscott et al. ................ 175/66 |
| 4,030,558 A |   | 6/1977 | Morris ......................... 175/39 |
| 4,176,545 A | * | 12/1979 | Oddo ............................ 73/64 |
| 4,287,761 A | * | 9/1981 | Moffet et al. ............. 73/152.19 |
| 4,381,159 A |   | 4/1983 | Payne ......................... 401/118 |
| 4,492,921 A | * | 1/1985 | Sandulyak et al. ......... 324/204 |
| 5,041,856 A | * | 8/1991 | Veronesi et al. ............ 324/204 |
| 5,161,409 A | * | 11/1992 | Hughes et al. ........... 73/152.19 |
| 5,264,832 A | * | 11/1993 | Parmer ....................... 340/631 |
| 5,540,089 A | * | 7/1996 | Fitch ........................ 73/61.42 |
| 5,614,830 A | * | 3/1997 | Dickert et al. .............. 324/553 |
| 5,616,842 A | * | 4/1997 | Armengaud et al. ..... 73/152.18 |
| 5,918,272 A | * | 6/1999 | Snyder et al. ............. 73/61.42 |
| 5,944,195 A |   | 8/1999 | Huang et al. ................. 209/39 |

* cited by examiner

Primary Examiner—Hezron Williams
Assistant Examiner—David J. Wiggins
(74) Attorney, Agent, or Firm—James M. Duncan

(57) ABSTRACT

A method and apparatus for retrieving magnetic casing fragments from a well using a shrouded magnet are disclosed. Retrieving casing fragments allows the determination of weight loss from the casing to assist in analyzing the integrity and the condition of the casing and to determine whether more expensive analysis is required. The shrouded magnet, that is formed by a non-magnetic container enclosing a source of magnetic field, recovers metal casing fragments by attracting them and other magnetic materials from oil and gas well fluids passing by the shrouded magnet device, which fragments are easily separated from the device by removing the source of magnetic field from the container.

9 Claims, 4 Drawing Sheets

METHOD AND APPARATUS FOR ANALYZING CASING WEAR AND RETRIEVAL OF METALLIC FRAGMENTS

BACKGROUND OF THE INVENTION

The present invention relates to an apparatus and method for removing magnetic materials from fluids discharged from a well, and more particularly to an apparatus and method for removing casing fragments from drilling and workover fluids which are circulated in oil and gas wells to ascertain the metal loss from the casing lining the bore of the well. In the drilling of oil and gas wells, drilling fluid, commonly referred to as "mud," is used for a variety of purposes, including: (1) maintaining hydrostatic pressure on the zones being drilled to maintain control over high pressure zones; (2) removing drill cuttings from the well and the face of the bit; and (3) to assist in drilling by the jetting action of the drilling fluid through the nozzles of the bit. Drilling fluid is commonly circulated down the string of drill pipe, pumped through the nozzles of the bit, and circulated out of the well through the annulus between the drill pipe and the casing and/or open hole. Once the drilling fluid returns to the surface, the fluid is circulated through various pieces of equipment to remove cuttings and solids so that the drilling fluid may be recirculated back into the wellbore.

As a well is drilled, steel casing is commonly inserted and cemented in the well to line those portions of the well already drilled. The casing protects the well from collapse, cave-in, and provides control over pressurized zones. In the course of drilling a well, multiple strings of casing may be inserted into the well, each subsequently installed casing string a smaller diameter than the previously installed casing string. Once a casing string is cemented in place, drilling operations may continue by drilling out through the casing "shoe." In some cases, such as when the lower portion of a well is lost, or if a well is being redrilled, the casing wall will be intentionally drilled through or milled in order to sidetrack the well, and drill in a different direction. However, at other times the casing wall is penetrated unintentionally.

It is known that when drilling, and when completion and workover tools are run through or operated inside of the casing, casing damage may occur. Often, the tolerances between the inside diameter of the casing and the outside diameter of the drill bit, drilling assembly, or other tools are tight, causing casing wear or puncture. Casing may also be damaged from continued rotation of the drilling assembly or drill pipe inside the casing, repeated trips of tools, the drilling assembly and drill pipe through the casing, or down hole conditions which result in the drill bit penetrating the wall of the casing rather than drilling through the casing shoe or formation. Because the casing protects the integrity of an oil and gas well, and protects the surrounding environment from releases of hydrocarbons from the well bore, it is important and useful to monitor the condition of the casing strings, particularly during drilling and workover operations.

Various means are known for monitoring casing integrity. Various downhole tools, such as mechanical calipers or electronic evaluation tools may be run through the casing to determine remaining wall thickness or to identify places where the casing wall has been damaged. However, running these tools is expensive, and generally requires removing the drill pipe, drilling assembly and bit from the well. Because of the expense, downhole evaluation tools are generally not run until there is reason to believe the casing may have been damaged, or where it is desirable to acquire a baseline analysis of the casing condition.

It is therefore desirable to have a cost-effective method of monitoring casing wear during drilling operations. One such method is to collect casing fragments contained within the drilling fluid, and weigh and record the weight of the fragments to estimate the total weight of casing loss and compare the amount of loss to the initial weight of the casing. Visual examination of the recovered fragments or more detailed analysis may also provide important information regarding the location or extent of the casing damage. If this method indicates an abnormal degree of metal loss from the casing, downhole tools may be run to determine the location and extent of damage.

Solids and cuttings are generally removed from drilling fluids at the surface by solids control equipment such as shale shakers and hydrocyclones, which dump solids into collection bins. In order to efficiently and accurately recover casing fragments, any device used to recover the fragments must be placed between the point of fluid discharge from the well and the solids control equipment. It is known to place a "ditch magnet" into the drilling fluid system to collect casing fragments from the drilling fluids. The typical ditch magnet is heavy, and requires at least two persons to lower it into the drilling fluid stream. As metal fragments adhere to the ditch magnet, the device becomes even heavier and difficult for personnel to remove. Removal of the metal particles from the ditch magnet is difficult because of the strong magnetic field. Drilling personnel usually run their hands over the surface of the ditch magnet in an effort to strip the magnetic materials from the magnet. This process is slow, laborious, and potentially dangerous to personnel because the metal fragments can be sharp enough to penetrate gloves and clothing. Removal and retrieval of all magnetic particles is therefore difficult, leading to injury and mistakes in determining the actual amount of metal loss from the casing. There is a need for an apparatus for inexpensive removal of casing fragments from drilling fluids without the disadvantages of the known devices.

SUMMARY OF THE INVENTION

The present invention is directed to a method and apparatus for removing casing fragments from drilling and workover fluids circulated in oil and gas wells which meets the need identified above.

The disclosed apparatus is a shrouded magnet for retrieving metal fragments from oil and gas well fluids comprising three basic components, a container composed of non-magnetic material, a source of magnetic field disposed within the container, and a cap for sealing the container. The container has an opening, an outer surface, an inner peripheral surface and a base opposite the opening. The magnetic source is disposed within the container adjacent to the inner peripheral surface so that a magnetic field exists at the outer surface. Flow vanes may be attached to the outer surface; a handle may be attached to the cap; and an extension may be attached to the base to increase the stability of the device as it stands in the fluid stream.

An alternative embodiment of the device includes a plurality of magnets disposed within the container. The plurality of magnets may be assembled in three groups comprising a top group, a middle group and a bottom group in relative sequence from the opening of the container to the base, each group comprising a plurality of magnets in facing relation, the plurality of magnets in each group having the same magnetic pole orientation. Each group may be separated from the adjacent group with a non-magnetic spacer. The polarity of each group may be adjusted to increase the effectiveness of the device, such as orienting the north magnetic pole of the top group to face the cap and the south pole of the top group to face the base, orienting the south magnetic pole of the middle group to face the cap and the north pole to face the base, and orienting the north pole of the bottom group to face the cap and the south pole oriented face the base.

In another embodiment of the device, each magnet has a bore such that the bores of adjacent magnets are aligned along the vertical axis of the container and the magnets are disposed within the container adjacent to the inner peripheral surface so that a magnetic field exists at the outer surface. In this embodiment, a retention rod, having a top and a bottom, is inserted through the bore of each magnet and the bottom of the rod received within a receptacle on the inside surface of the base. The top of the retention rod may be attached to the inside surface of the cap, and a stop collar may be affixed to the retention rod between the bottom of the rod and the plurality of magnets, so that the magnets may be removed by removing the cap from the container. In this embodiment, as with other embodiments, the plurality of magnets may be assembled in groups, with the polarity of magnets in each group having the same magnetic pole orientation, and each group may be separated from the adjacent group with a non-magnetic spacer. The polarity of each group may be adjusted to increase the effectiveness of the device.

A method for recovering magnetic casing fragments from fluids discharged from a well is also disclosed. In this method the discharged fluids are passed through a magnetic field created by a shrouded magnet, where the shrouded magnet has magnets contained within a nonmagnetic container. The magnetic field separates the casing fragments and other magnetic materials from the fluids. When desired, the shrouded magnet is removed from the fluid stream, and the magnets are removed from the nonmagnetic container, so that the magnetic field attracting the casing fragments is removed and the casing fragments are released and collected.

A method for analyzing the condition of well casing by collecting magnetic casing fragments from fluids discharged from a well is also disclosed. In this method, the discharged fluids are passed through a magnetic field created by a shrouded magnet, where the shrouded magnet has magnets contained within a nonmagnetic container. The magnetic field separates the casing fragments and other magnetic materials from the fluids. When desired, the shrouded magnet is removed from the fluid stream, and the magnets are removed from the nonmagnetic container, so that the magnetic field attracting the casing fragments is removed and the casing fragments are released and collected. The casing fragments are weighed and the total weight of the recovered casing fragments are calculated. The total weight of the casing originally installed in the well is also calculated so that the percent of metal loss from the casing may be obtained by dividing the total weight of the casing fragments recovered from the well by the total weight of the casing originally installed in the well. The casing fragments may also be visually examined.

These and other features, aspects, and advantages of the present invention will become better understood with regard to the following description, appended claims, and accompanying drawings.

DETAILED DESCRIPTION OF THE EMBODIMENTS

Figure 1:
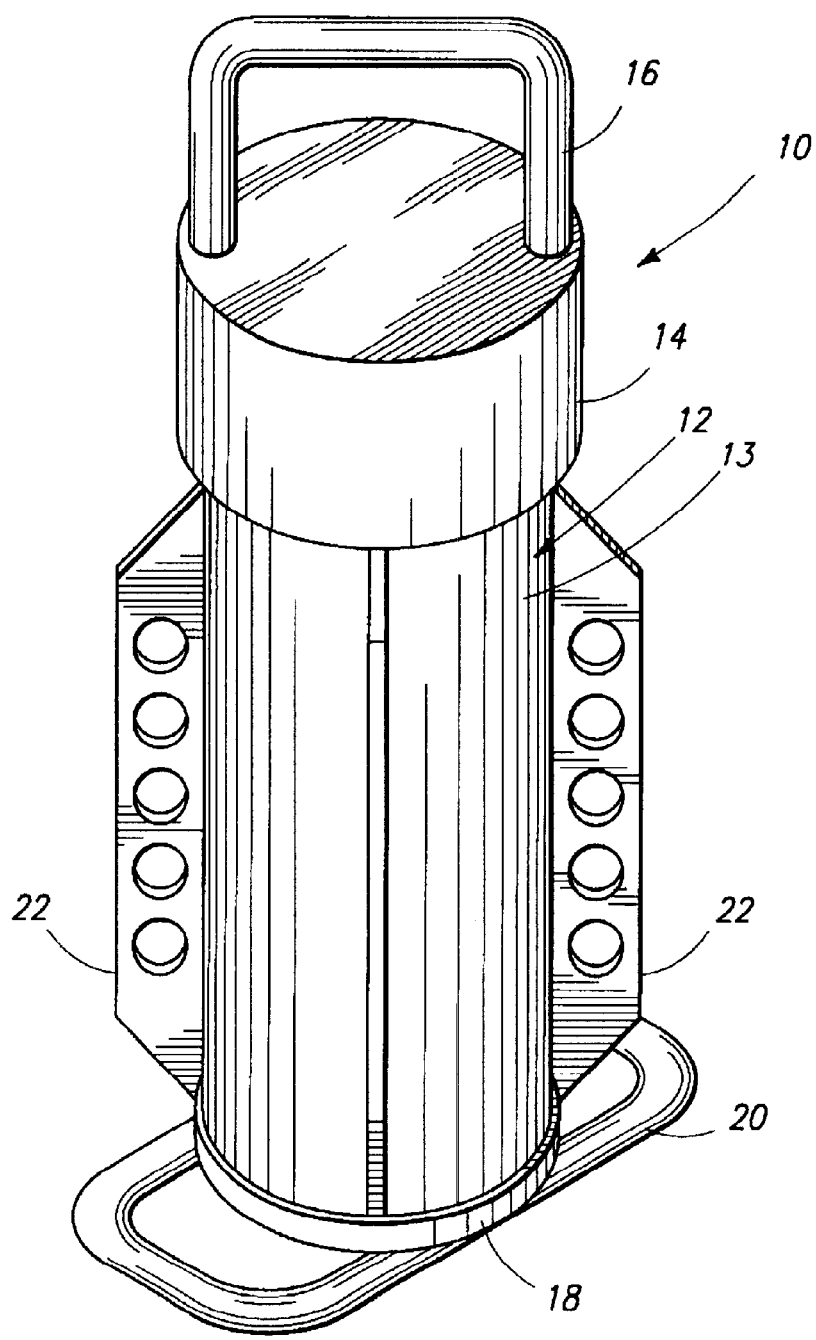
FIG. 1 is an isometric view of the exterior of the disclosed invention.

As shown in FIG. 1, the exterior components of the shrouded magnet 10 are a container 12 having an opening, and an outer surface 13, a cap 14 for sealing the container, and a base 18. While the shrouded magnet 10 may be placed in the fluid stream in any orientation, the operator may find that it is most convenient to place the device with the longitudinal axis of the container 12 perpendicular to the direction of fluid flow, so that the device is standing on the base 18. When standing on the base 18, the stability of the device may be increased by attaching a base extension 20 to the base 18. It may also be desirable to attach flow vanes 22 to the container 12, so that the long axes of the flow vanes are oriented generally parallel to the longitudinal axis of the container 12. The flow vanes 22 may have fluid passages, such as holes, to direct fluid flow around the outer surface 13 of the container 12.

Figure 2:
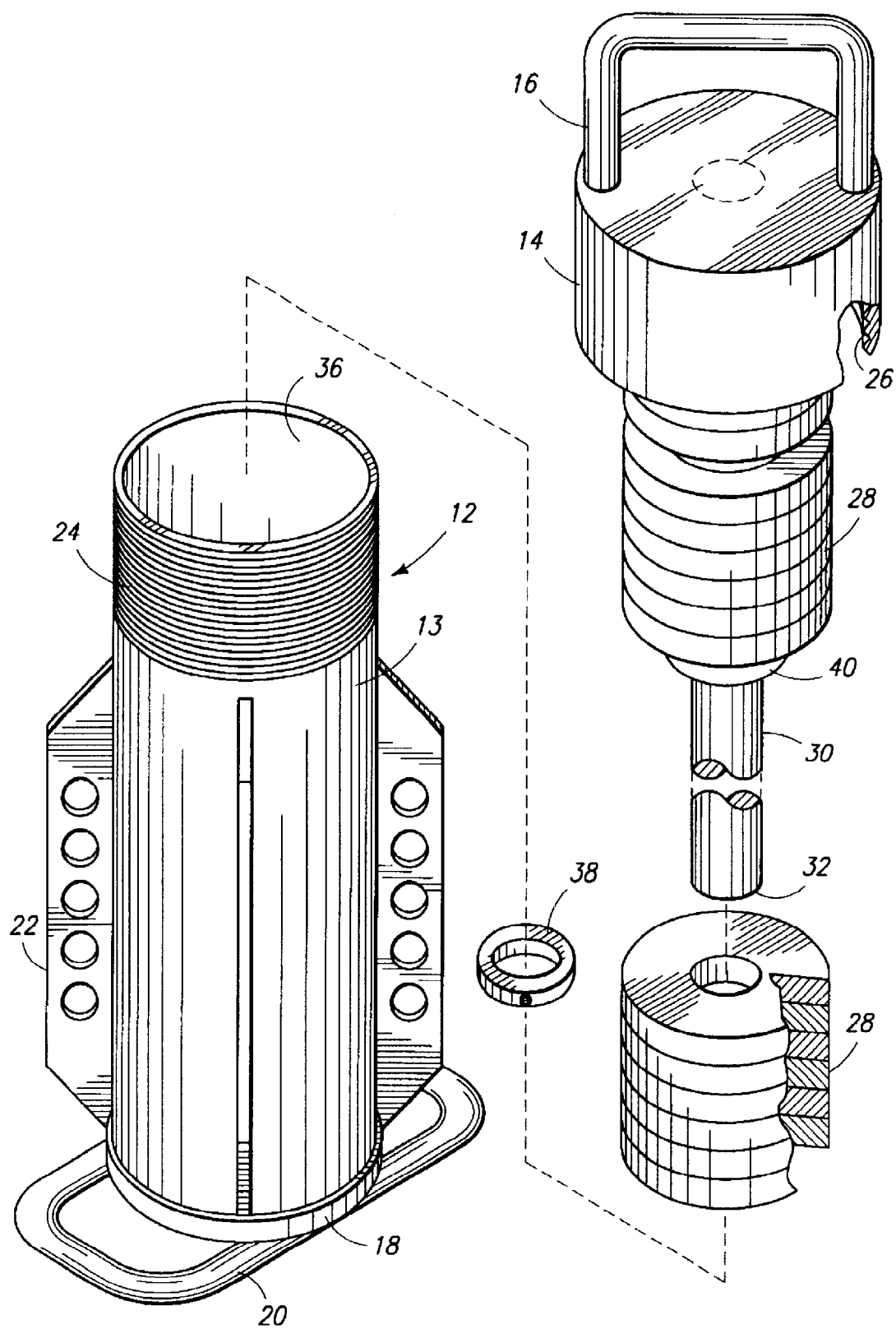
FIG. 2 is an exploded isometric view of the disclosed invention

As shown in FIG. 2, the internal components of the shrouded magnet 10 include a plurality of iron magnets 28 disposed within the container 12. However, any means for creating a magnetic field extending through the container 12 to the outer surface 13 will accomplish the required purpose, including the iron magnets 28, magnetic alloys or an electromagnet comprised of an iron core surrounded by a current-carrying coil. If an electromagnet is used, a means of producing electrical current is required. Such means may include either a direct current source such as a battery or an alternating current source such as a generator or utility power. A battery may be inserted inside the container 12, thereby requiring no external leads to the coil. If an alternating current source is used, external leads to the coil will be required and the leads must be introduced into the container 12 so as to maintain a fluid-tight seal within the container, by methods well known in the industry.

The container 12 should be constructed of a non-magnetic material such as aluminum, fiberglass or plastic. The use of non-magnetic materials for the container 12 prevents the container from becoming magnetized, thereby allowing any magnetic materials attached to the outside surface 13 of the container to disengage when the magnets 28 are removed from within the container 12.

Figure 3:
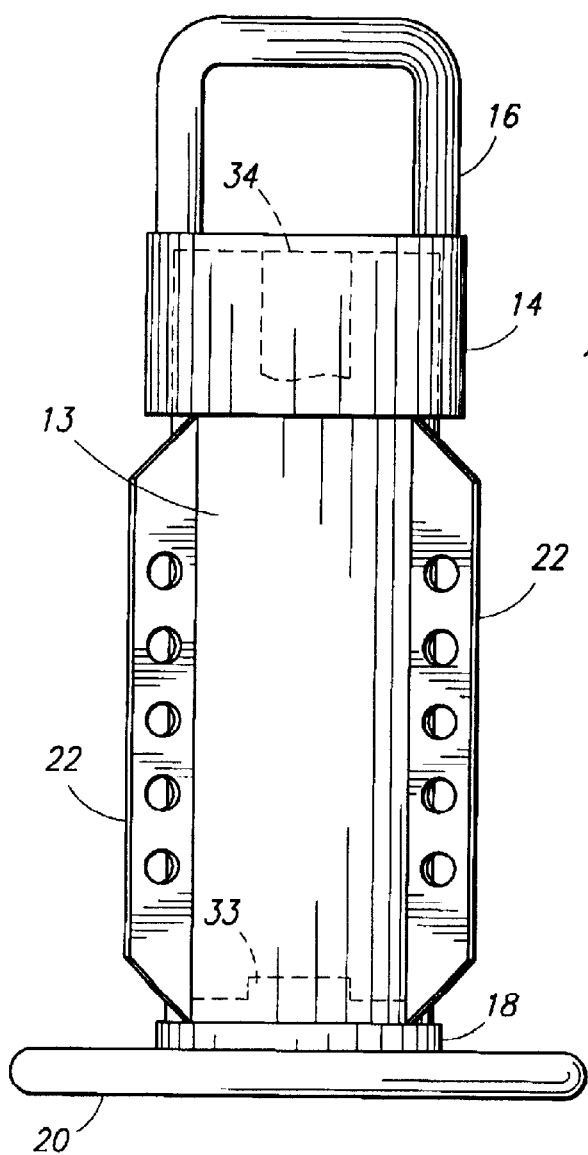
FIG. 3 shows a side view of the exterior of the disclosed invention.
Figure 4:
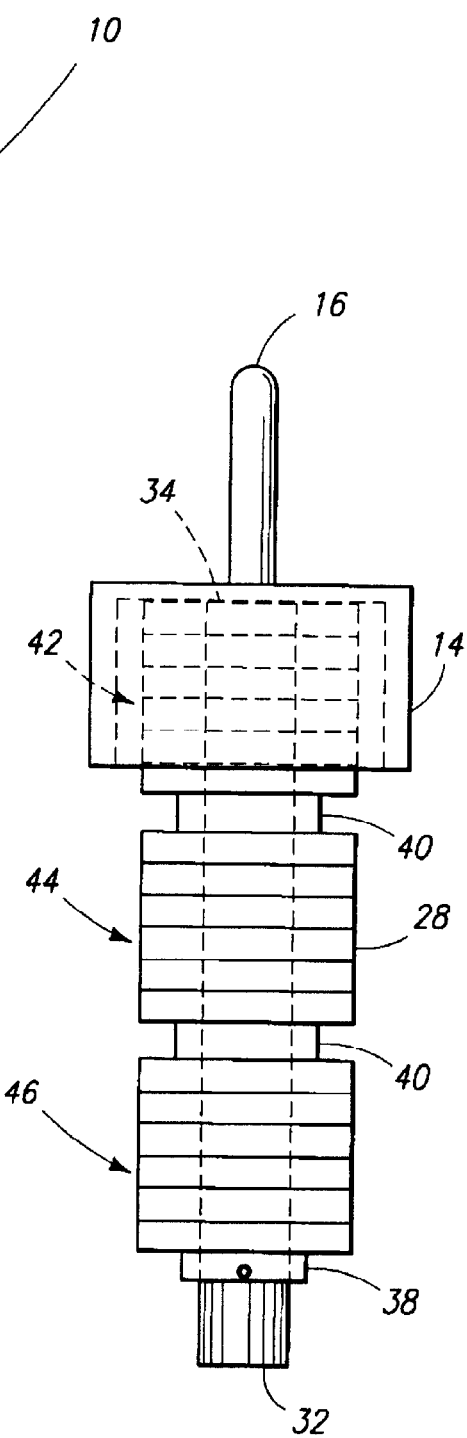
FIG. 4 shows a side view of the internal components of the disclosed invention.
Figure 5:
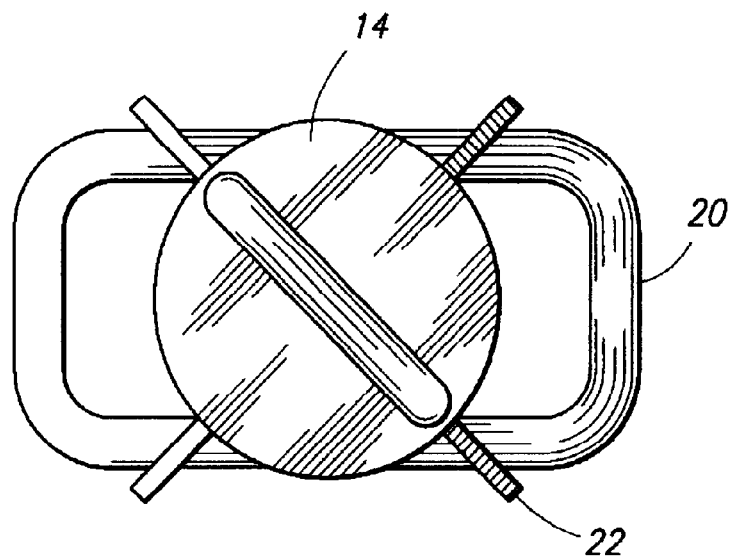
FIG. 5 shows a top view of the exterior of the disclosed invention.
Figure 6:
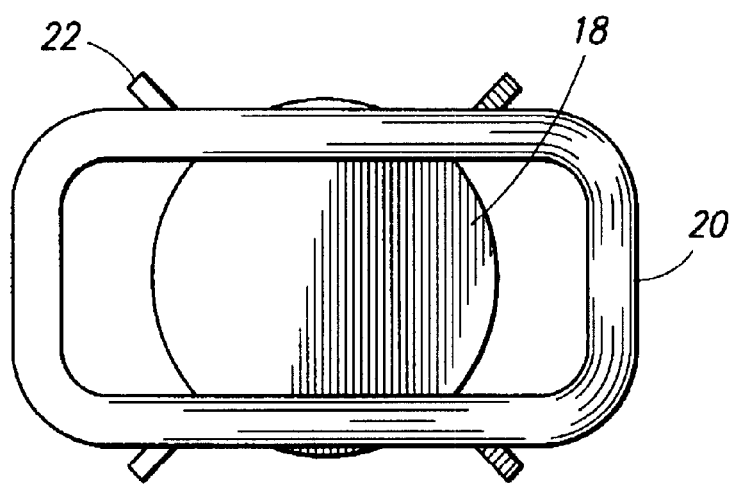
FIG. 6 shows a bottom view of the exterior of the disclosed invention.

In the embodiment shown in FIG. 2, a plurality of magnets 28 are disposed in facing relation. Each magnet 28 has a bore such that the bores of adjacent magnets 28 are aligned along the vertical axis of the container 12, so that the outside edge of each magnet is adjacent to the inner peripheral surface 36 of the container 12, resulting in the creation of a magnetic field extending to the outside surface 13 of the container 12. As shown in FIG. 2 and FIG. 4, a retention rod 30, having a bottom end 32 and a top end 34 may be inserted through the bores of the magnets 28. A stop collar 38 or other type of retaining device may be affixed to the bottom end 32 of the retention rod 30, which will allow the removal of all of the magnets 28 from the container 12 simply by removing the retention rod 30. The top end 34 of the retention rod 30 may be attached to the inside surface of the cap 14, so that removal of the cap 14 and pulling upwards will also remove the retention rod 30, the magnets 28, and the stop collar 38. As shown on FIG. 3, a receptacle 33 may be fashioned on the inside surface of the base 18 for receiving and stabilizing the bottom end 32 of the retention rod 30.

It has been found that if all of the magnets 28 within the container 12 are oriented so that the polarities (i.e., the north pole and south pole) of each magnet 28 are facing in the same direction, metal particles recovered from the drilling fluid tend to concentrate at that portion of the outside surface 13 of the container 12 where the magnetic field is the strongest. However, as shown in FIG. 4, the magnets 28 may be placed in groups, such that each magnet 28 in a group is oriented so that the polarities of each magnet in the group are facing the same direction, but the polarity of each group within the container 12 may be different from an adjacent group. For example, if three groups of magnets 28 are formed, the north magnetic pole of the top group 42 may be oriented facing the top end 34 of the retention rod 30 and the south pole oriented facing the bottom end 32; the south magnetic pole of the middle group 44 may be oriented facing the top end 34 and the north pole oriented facing the bottom end 32; and, the north pole of the bottom group 46 may be oriented facing the top end 34 and the south pole oriented facing the bottom end 32. Alternating the magnetic polarity of each group of magnets 28 will result in distributing metal fragments recovered from the drilling fluid to be more evenly distributed on the outside surface 13 of the container 12, allowing a larger accumulation of metal fragments before removal of the fragments is required. Each group of magnets 28 may be separated by a spacer 40.

The cap 14 may be equipped with a handle 16 to assist the user in lifting or otherwise maneuvering the device. The container 12 should be equipped with sealing means 24, such as threads and/or "O" rings and the cap 14 should have matching sealing means 26, such as threads and/or "O" rings to prevent fluid flow into the interior of the container 12.

Using the invention disclosed herein, a method has been developed for removing metallic casing fragments from fluids discharged from an oil or gas well. In this method, magnetic casing fragments are removed from fluids discharged from an oil or gas well by passing the fluids through a magnetic field created by a shrouded magnet 10. The shrouded magnet 10 contains magnets 28 contained within a nonmagnetic container 12, which act to separate the casing fragments and other magnetic materials from the well fluids. Upon accumulation of the metallic casing fragments upon the outside surface 13 of the container 12, the shrouded magnet 10 is removed from the fluids and the magnets 28 are removed from the nonmagnetic container 12, so that the magnetic field attracting the casing fragments is removed and the casing fragments may be released and collected.

Using the invention disclosed herein, a method has been developed for analyzing casing wear and making determinations of the casing integrity. In this method, as described above, magnetic casing fragments are removed from fluids discharged from an oil or gas well by passing the fluids through a magnetic field created by the shrouded magnet 10, having magnets 28 contained within a nonmagnetic container 12, which act to separate the casing fragments and other magnetic materials from the well fluids. Upon accumulation of the metallic casing fragments upon the outside surface 13 of the container 12, the shrouded magnet 10 is removed from the fluids and the magnets 28 are removed from the nonmagnetic container 12, so that the magnetic field attracting the casing fragments is removed and the casing fragments may be released and collected. The collected casing fragments are thereafter weighed and a total weight for all collected fragments is calculated. The total weight of the casing originally installed in the well is also calculated, based upon either recorded weights for each individual length of casing, or upon casing tables providing the weight per foot for the particular size and grade of casing. The percent of metal loss from the casing may then be calculated by dividing the total weight of the casing fragments recovered from the well by the total weight of the casing originally installed in the well.

The casing fragments are also visually examined to ascertain the nature of the casing wear. For example, large sections of casing wall with tool marks may call into question the integrity of the casing, but a small volume of small shavings may indicate uniform wear in the casing. Depending upon the material used for each length of casing, visual inspection may allow the determination of the particular casing string from where a particular casing fragment came. The location of a problem area may also be approximated by the depth of the drill pipe or tool string at the time the fragment is accumulated at the shrouded magnet, the volume of fluid within the well, and the displacement and speed of the pumps circulating the fluid.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A method of analyzing the condition of well casing by collecting magnetic casing fragments from fluids discharged from a well comprising the steps of:
   (a) passing the fluids through a magnetic field created by a shrouded magnet to separate the casing fragments and other magnetic materials from the fluids;
   (b) separating the casing fragments from the other magnetic materials;
   (c) weighing the casing fragments;
   (d) calculating the total weight of the casing fragments recovered from the well;
   (e) calculating the total weight of the casing originally installed in the well;
   (f) calculating the percent of metal loss from the casing by dividing the total weight of the casing fragments recovered from the well by the total weight of the casing originally installed in the well; and
   (g) visually examining the casing fragments.

2. A shrouded magnet for retrieving metal fragments from oil and gas well fluids comprising:
   (a) a container, having an opening, the container composed of non-magnetic material, the container comprising an outer surface, an inner peripheral surface and a base opposite the opening;
   (b) a magnet disposed within the container adjacent to the inner peripheral surface so that a magnetic field exists at the outer surface;
   (c) a cap adapted to seal the container at the opening; and
   (d) a plurality of flow vanes attached to the outer surface.

3. A shrouded magnet for retrieving metal fragments from oil and gas well fluids comprising:

(a) a container, having an opening, the container composed of non-magnetic material, the container comprising an outer surface, an inner peripheral surface and a base opposite the opening;

(b) a plurality of magnets disposed within the container adjacent to the inner peripheral surface so that a magnetic field exists at the outer surface, wherein the plurality of magnets are assembled in three groups arranged around the circumference of said inner peripheral surface, said three groups comprising a top group, a middle group and a bottom group in relative sequence from the cap to the base, each group comprising a plurality of magnets in facing relation, the plurality of magnets in each group having the same magnetic pole orientation; and (c) a cap adapted to seal the container at the opening.

4. The shrouded magnet of claim 3 wherein a first spacer, composed of non-magnetic material, is disposed between the top group and the middle group, and a second spacer, composed of non-magnetic material, is disposed between the middle group and the bottom group.

5. The shrouded magnet of claim 4 wherein the north magnetic pole of the top group is oriented facing the cap and the south pole oriented facing the base, the south magnetic pole of the middle group is oriented facing the cap and the north pole oriented facing the base, and the north pole of the bottom group oriented facing the cap and the south pole oriented facing the base.

6. A shrouded magnet for retrieving metal fragments from oil and gas well fluids comprising:

(a) a container, having an opening, the container composed of non-magnetic material, the container comprising an outer surface, an inner peripheral surface and a base opposite the opening;

(b) a plurality of magnets in facing relation, each magnet having a bore such that the bore of adjacent magnets is aligned along the vertical axis of the container, said magnets disposed within the container adjacent to the inner peripheral surface so that a magnetic field exists at the outer surface;

(c) a retention rod, having a top and a bottom, said rod inserted through the bore of each magnet, wherein the top of the retention rod is attached to the cap and the bottom of the rod disposed on the base, and a stop collar is affixed to the retention rod between the bottom of the rod and the plurality of magnets; and (d) a cap adapted to seal the container at the opening.

7. The shrouded magnet of claim 6, wherein the plurality of magnets are assembled in three groups comprising a top group, a middle group and a bottom group in relative sequence from the top of the retention rod to the bottom of the retention rod, each of the magnets in each group in facing relation, the magnets in each group having the same magnetic pole orientation.

8. The shrouded magnet of claim 7 wherein a first spacer, composed of non-magnetic material, is disposed between the top group and the middle group, and a second spacer, composed of non-magnetic material, is disposed between the middle group and the bottom group.

9. The shrouded magnet of claim 8 wherein the north magnetic pole of the top group is oriented facing the top of the retention rod and the south pole oriented facing the bottom of the retention rod, the south magnetic pole of the middle group is oriented facing the top of the retention rod and the north pole oriented facing the bottom of the retention rod, and the north pole of the bottom group oriented facing the top of the retention rod and the south pole oriented facing the bottom of the retention rod.

* * * * *